June 10, 1969

F. NETTEL

3,448,581

LARGE STEAM POWER PLANT SUITABLE FOR HANDLING PEAK LOADS

Filed Jan. 15, 1968

Frederick Nettel
INVENTOR.

United States Patent Office 3,448,581
Patented June 10, 1969

3,448,581
LARGE STEAM POWER PLANT SUITABLE FOR HANDLING PEAK LOADS
Frederick Nettel, 173 Chapel Road,
Manhasset, N.Y. 11030
Filed Jan. 15, 1968, Ser. No. 698,035
Int. Cl. F01k 7/16, 19/00
U.S. Cl. 60—67                          6 Claims

ABSTRACT OF THE DISCLOSURE

A steam power plant for producing and controlling peak outputs, comprising a steam producer, a first multi-stage condensing turbine with multi-stage extraction for regenerative feedwater heating, a second condensing steam turbine receiving steam from one (or more) extraction stages of the first turbine. A first governor controlling the first turbine by varying the steam flow at its inlet when working in the range from zero to rated load, a second governor operative only when the sum output from both turbines exceeds the rate output of the first turbine, when the steam flow at the entrance to the first turbine is kept constant at its rated value, while the second governor varies the steam flow to the second turbine and therefore its output, and simultaneously varies the steam flow to the feedwater heater connected to the same extraction point, so that the steam extraction from the first turbine at this point remains unchanged over the whole combined turbine output range of both turbines, and also the output of the steam producer remains at its rated value.

---

My invention is applicable to turbines utilizing regenerative feedwater heating for which purpose steam is extracted at one or more intermediate pressure turbine stages and condensed in a feedwater heater or heaters to heat the turbine condensate on its way back to the steam producer. For the purpose of this specification the term "steam producer" includes steam boilers of any type burning fossil fuels of any kind, as well as nuclear reactors moderated or unmoderated, in particular also fast breeder reactors irrespective of cooling medium utilized.

Known means to operate plants at overloads include bypassing the first (governor) turbine stage and/or provision of peaking power units such as diesel or gas turbine sets or very simple steam boiler-turbine sets kept in stand-by running condition.

Overload capacities of modern high-pressure steam boilers (mostly once-through boilers) and of large turbines fed by them is very limited which also limits the use of bypassing the governor stage. The other means are very expensive and inefficient. Their use was sometimes justified in the past when plant outputs were small by todays' sizes and the number of generators operating in parallel in one system (grid) limited. Today, with individual turbine outputs of 200 to 1000 mw., and grid outputs of 2000 mw. or more, peak performance must be measured in percent of grid output, preferably 10 percent or more, and to be practical, must involve only moderate additional investments, while furnishing peak outputs automatically and instantaneously.

It is the basic purpose of this invention to solve the problem of handling peak loads in a novel and simple manner. How this and other and further objects are achieved will become clear from the following specification when taken together with drawings forming part of it, and showing diagrammatically embodiments of my invention by way of simple schematic non-limiting examples.

In the drawing FIG. 1, a plant is shown with three feedwater heaters and valves for automatically controlling the steam flow at outputs above rated outputs.

Figure 1:
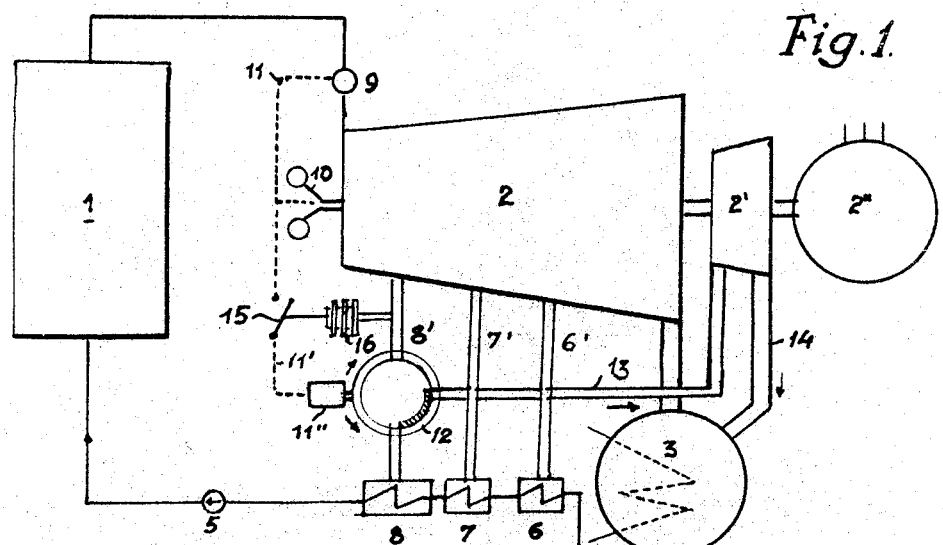

It is known in the art to produce peak outputs in existing steam turbine power plants by reducing steam extraction from intermediate turbine stages, mostly manually, leading to the steam no more extracted through the low pressure turbine stages.

This can be effective in condensing turbines to increase outputs up to around five percent. This arrangement requires substantial increases in steam flow through the low pressure part of the turbine. In very large turbines working at high vacuum the specific steam volume increases very rapidly in the lowest pressure stages requiring blade lengths approaching the mechanically possible limits.

This invention solves the problem without change in the steam producer (boiler or reactor) and without change at all in the main steam turbine, by adding a second simple medium-pressure condensing turbine capable of producing the output above the rated main turbine output. This second turbine, which may be coupled with the main turbine, receives regulatable steam branched off the connecting pipe between the main turbine and preferably one or more of the highest-pressure feedwater heaters. Steam is bypassed into the second turbine when the total plant output exceeds rated output. This is done in such manner that the additional output needed is supplied by the second turbine.

Obviously, such bypassing does not involve change in the steam output from the steam producer nor of the steam flow through the main turbine. The only effect will be a reduction in the feedwater end-temperature at the point where it enters the steam producer. This reduction will appear only slowly due to the great heat capacitance of the steel masses of the steam producer and thus does not affect the capacity of the plant to furnish the desired short-time peak outputs. Longer lasting peak outputs can be managed by slowly increasing the heat input in the steam producer via the conventional slower responding combustion control or other means, or by providing an accumulator tank for hot feedwater, as will be described hereafter. Plant heat economy is only slightly affected because the efficiency of the steam producer and the main turbine remain high. The second turbine handles only the kw. above rated plant output during peak performance so that it can be of simple and cheap design (few stages). The cutting off of one or two feedwater heaters temporarily increases heat consumption per kwh. by not more than one or two percent in modern plants operating mostly with five to eight feedwater heaters.

Actually, the second turbine represents a "spinning" power reserve the output of which gradually decreases toward zero as the total plant output approaches the rated output of the main turbine. In this condition, when no steam is bypassed from the main turbine, the no-load losses in the second turbine can be reduced by keeping it connected to the condenser, which it may share with the main turbine. Since all its stages are then rotated in high vacuum, losses are minimal and blade overheating is avoided. At peak outputs of the plant more steam flows into the condenser slightly reducing its vacuum, which is of no significance economically.

The electric generator means, which may be separate for the two turbines, have to be rated to meet output requirements. Where both turbines drive a single generator, a rating increase can be obtained cheaply by temporarily increasing the pressure of the hydrogen cooling usually provided.

My invention can also be applied to plants in which the main turbine operates with steam reheat, in which case steam bypassing can take place preferably at or near reheat pressure.

It is within the scope of this invention to use the second turbine for starting the main turbine from standstill by feeding into it steam of suitable pressure from an available source, for example, another main turbine. It can also be used for driving auxiliary pumps such as feedwater pumps, etc.

Reverting now in more detail to FIG. 1 of the drawing which shows diagrammatically a simple embodiment of my invention.

In the drawing 1 is the steam producer, boiler or reactor, 2 the steam turbine, 2'' the electric generator or other consumer of energy, 3 the condenser, 4 the condensate pump, 5 the boiler feed pump. Interposed in the pipe between the condensate pump and the boiler feed pump are the feedwater heaters 6, 7 and 8, the latter being fed with extraction steam from the turbine via the pipes 6', 7' and 8'. 9 are the valves controlling the steam volume at turbine entrance, 10 is the governor driven from the turbine shaft, 11 is an impulse line between 9 and 10 active during operation of the turbine between no-load and rated load, 12 is a rotary valve in pipe 8' the operation of which will be described as this specification proceeds.

2' is a second turbine arranged on the same shaft with 2. The inlet of 2' is connected by the pipe 13 to the valve 12 as shown. 2' discharges into the condenser 3 via the pipe 14. The valve 12, in the position shown keeps the pipe 8' connected to the heater 8 while it shuts off steam exit through the pipe 13. Valve 12 receives impulses to rotate via the impulse line 11' and the servomotor 11''. This impulse line is shown in the drawing interrupted by the switch 15. The latter is closed automatically by the elastic bellow 16 connected to the pipe 8' when the stage pressure at the extraction point 8' reaches or exceeds a value corresponding to rated output of the turbine 2.

The valve 12 acts in fact as second governor for the turbine 2', operative only in the total plant output range above the rated output turbine 2 as follows: At outputs up to the rated output of turbine 2 the governor 10, via the impulse line 11, opens or closes the steam admission valves 9 in the same way as usual in conventonal plants. When the required total plant output exceeds said output, the valves 9 remain fully open while the switch 15 closes. With the servomotor now in action it moves, when more output is required, the valve 12 in clockwise direction, thereby throttling steam flow into the heater 8 and opening the bypass line 13, allowing steam to enter the turbine 2', enabling it to produce additional power. If power requirements drop, the valve 12 moves in opposite direction, closing the bpyass 13 somewhat while opening the inlet to heater 8 more. Obviously, plan output operation is fully controlled also for the range up to maximum peak output, part of which is supplied by the turbine 2'.

It is important to note that my invention permits operation above rated output of 2 while the output of the steam producer 1 remains constant, and what is equally important, also the steam flow through all stages of the turbine 2 remains unchanged.

Where power plants serve a grid (group of power plants) it is of economic importance to properly decide when and how much peak capacity must be added to conform with growth of the grid.

This invention simplifies this problem because the actually operating boiler-turbine-generators need not be materially changed except for the addition on rotary valves 12 and some medium-pressure pipe connections. Thus the main sets can be installed and operated without the turbines 2' which can be added at any time later. Even the adding subsequently of turbines 2' in a plant as per FIG. 1 would create some design problems unless anticipated.

Figure 2:
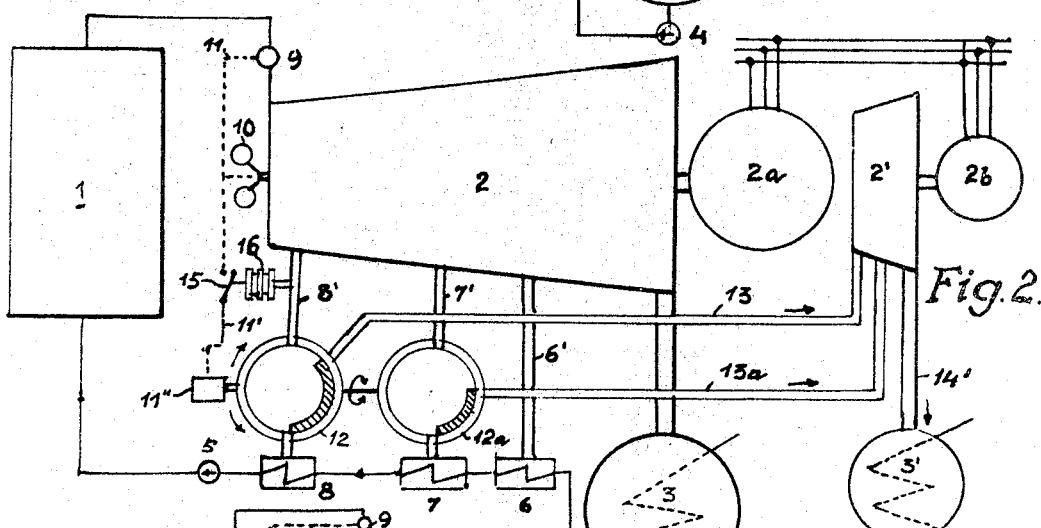
FIGURE 2 is a modification of the plant as per FIG. 1.

These problems can be minimized, and other advantages realized, if an arrangement as per FIG. 2 is chosen.

In FIG. 2 parts equivalent to those in FIG. 1 are denoted by the same numerals.

The main differences as compared with FIG. 1 are: there are two generators 2a and 2b, the first coupled to 2, the second to 2' on separate shafts as shown discharging into condensers 3 and 3' respectively via conduits 14 and 14'. The generators are operating synchronized on a common grid represented here by the busbars 2s. There are two regulating rotary valves 12 and 12a connected to extraction pipes 8' and 7', respectively, both operated by the servomotor 11'' and two bypass pipes 13 and 13a for leading steam into the turbine 2' at different pressure points.

Figure 3:
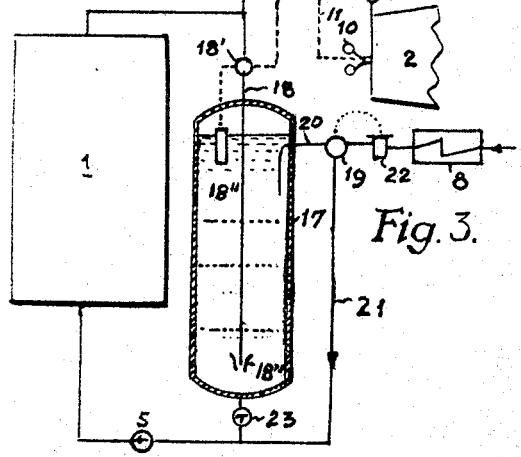
FIGURE 3 is a modification showing the use of a mixing-type feedwater heater-accumulator.

As mentioned before, peak output performance can continue for some time also in this plant before the feed water temperature at the inlet to the steam producer will begin to drop, If, however, peak output is required for a longer time period, this can be achieved by the modification of plants as per FIG. 1 or 2 and as shown in FIG. 3.

A mixing-type feedwater heater-accumulator 17 is interposed between the oulet from 8 and the boiler feedwater pump 5. This accumulator of predetermined capacity is normally filled with condensate and is supplied with steam from the steam producer through the pipe 18 with valve 18'. This valve is controlled by the steam flow to the turbine 2 and the condensate temperature at the top of 17. The condensate inlet to 17 is controlled by the 3-way valve 19 which can lead condensate either into the upper part of 17 through pipe 20 or it by-passes 17 through the pipe 21 as shown. 19 is controlled by impulses supplied by the thermostat 22 at the outlet of 8. 18' is operative only when the output of the turbine 2 is below its rated output, that means when not all the valves 9 are open.

The plants works as follows:

With the plant operating at an output approaching but still below the rated output of 2, the pipe 13 is closed. The accumulator is filled with condensate of a temperature lower than that prevailing at the outlet from 8 at rated output of 2. Under this condition steam enters 17 through 18 via the throttle valve 18'. 18 is equipped with mixing nozzles 18'' at its lower end and begins to heat the condensate from bottom up. This heating process is terminated by the thermostat 18'' when all of the condensate 17 is heated. During this heating the valve 19 by-passes 17 through pipe 21 via the feedwater pump 5 into the steam producer 1.

If now a total plant output above the rated output of 2 is required, the valve 12 opens the pipe 13 but operation without the accumulator can continue for some time until the temperature at 19 begins to drop. This causes the thermostat 22 to move valve 19 into a new position, opening the pipe 20 and shutting the pipe 21. Hot condensate now flows to the pump 5 which can continue until the supply from 17 is exhausted. In this condition peak output operation should be terminated, which implies that the pipe 13 closes. The non-return valve 23 prevents colder condensate from entering 17 at the bottom.

All though this peak output operation the turbine 2 works at its rated output and also the output of the steam producer remains unchanged with steam quantity, steam pressure and temperature normal.

From the above it will be clear that the duration of permissible peak output is determined by the capacity of the described condensate accumulator and it is within the scope of this invention to use more than one of such accumulators.

Obviously the cost of the equipment needed to convert an existing boiler-turbine-generator according to my invention to peak output capability is comparatively low, even for the largest units as compared with known other means. My invention is also applicable to mobile plants, for example, for ship propulsion.

What I claim is:

1. In the method of peak output production and regulation in steam power plants comprising a steam producer, a first multi-stage steam turbine in operational connection with said steam producer and power consuming means, said turbine equipped with steam extraction points at intermediate stages, said first turbine having first governor means for regulating output between no-load and rated load by varying the steam flow between the steam producer and said turbine, multiple feedwater heaters connected to said extraction points for regenerative preheating the feedwater on its way back to the steam producer, condenser means in operational connection with said first turbine, a second turbine disposed to receive steam from a steam extraction point of said first turbine and to discharge into said condenser means and for driving a power consumer a second governor for said second turbine for regulating its output while the said first turbine is operating at rated output, by regulating the steam flow from said first turbine into said second turbine, the steps,
while the sum of the outputs of both turbines is higher than the rated output of said first turbine, to keep the steam flow from the producer to said first turbine constant at its rated value while varying automatically the steam flow from said first into said second turbine in response to impulses from said second governor, increasing it for required total output increases, and decreasing it for required output decreases so that the output of said second turbine drops to zero if the total required plant output drops to the rated output of said first turbine, so that required temporary total outputs above the rated output said first turbine can be met practically instantaneously without substantial changes in the output (steam quantity, pressure and temperature) of the steam producer and without changes in the steam flow through said first turbine.

2. In the method as set forth in claim 1, in a power plant having a mixing-type condensate heater-accumulator of predetermined capacity interposed between a high-pressure regenerative feedwater heater and the entrance to the steam producer, said accumulator disposed to receive heating steam from the steam producer only when the output of said steam producer is below its rated output and when the condensate temperature in the accumulator is lower than the temperature prevailing at the outlet of the highest-pressure regenerative feedwater heater at rated load of said first turbine and while said second turbine is idling, the steps of
heating the condensate filling most of the said accumulator, by steam from the steam producer, while the latter is operating below its rated output to at least the temperature prevailing at the outlet of the highest-pressure regenerative feedwater heater while said first turbine is operating at rated output and while no steam is led into the second turbine and while
leading that condensate from said first turbine from the highest-pressure heater directly into the steam producer, bypassing the said accumulator, and
when the total plant output from both turbines exceeds the rated output of the first turbine, to discharge heating condensate from the accumulator into the steam producer and to lead the somewhat colder condensate from the highest-pressure feedwater heater into the accumulator to re-fill it, so that during this operation the output of the steam producer is maintained at rated value without additional heat input from any source.

3. In a steam power plant capable of producing and regulating required instantaneous peak outputs, the combination comprising a steam producer, a first multi-stage steam turbine in operational connection with said steam producer, said turbine being equipped with steam extraction points at intermediate pressure stages, a first steam condenser connected to said turbine, multiple feedwater heaters connected to said turbine by multiple first valved pipe means, for regeneratively preheating the feedwater on its way back to the steam producer, a first governor for regulating the output of said first turbine between no-load and a predetermined output, by automatically varying the steam flow at the turbine inlet, as known per se, a second condensing steam turbine disposed to receive steam through a pipe from a steam extraction point of the said first turbine and for discharging it after expansion into its condenser, said second turbine being coupled with a power consumer, a second governor for said second turbine operative only when the required total turbine output from both turbines is higher than the rated output of said first turbine, disposed to increase by valve means the steam flow into the second turbine automatically for required total output increases, while reducing the steam flow from the pipe from which the second turbine is fed to the feedwater heater also connected to it, so that required sudden peak outputs above the rated output of said first turbine can be met practically instantaneously without substantial changes in the output (steam quantity, pressure and temperature) from the steam producer and without changes in the steam flow through said first turbine.

4. In a steam power plant as set forth in claim 3, having the said first and second turbines arranged on a common shaft.

5. In a steam power plant as set forth in claim 3, having the first and second turbines discharging into a common steam condenser.

6. In a steam power plant as set forth in claim 3, having the second turbine receiving steam from more than one extraction point of the first turbine.

References Cited
UNITED STATES PATENTS 3,083,536 4/1963 Vogler _____ 60—67
3,108,938 10/1963 Nettel et al. _____ 60—73 X
3,175,953 3/1965 Nettel et al.

CARROLL B. DORITY, JR., *Primary Examiner.*

U.S. Cl. X.R.
60—70, 95, 107